(12) United States Patent
Lang

(10) Patent No.: US 6,538,341 B1
(45) Date of Patent: Mar. 25, 2003

(54) UNIVERSAL POWER SUPPLY FOR DIFFERENT SMALL ELECTRICAL DEVICES

(75) Inventor: Oliver Lang, Berlin (DE)

(73) Assignee: SOLARC Innovative Solarprodukte GmbH., Berlin (DE)

( * ) Notice: Subject to any disclaimer, the term of this patent is extended or adjusted under 35 U.S.C. 154(b) by 0 days.

(21) Appl. No.: 10/018,603
(22) PCT Filed: May 15, 2000
(86) PCT No.: PCT/DE00/01952
  § 371 (c)(1),
  (2), (4) Date: Dec. 17, 2001
(87) PCT Pub. No.: WO00/79673
  PCT Pub. Date: Dec. 28, 2000

(30) Foreign Application Priority Data

Jun. 17, 1999 (DE) .......................... 199 28 809

(51) Int. Cl.$^7$ ................................. H02J 1/10
(52) U.S. Cl. ........................... 307/18; 702/64
(58) Field of Search ............. 363/142; 702/60, 702/64, 65; 307/18, 21

(56) References Cited

U.S. PATENT DOCUMENTS 5,442,170 A * 8/1995 Kreft et al. ............ 250/227.11
5,506,490 A * 4/1996 DeMuro .................. 320/106
5,925,942 A * 7/1999 Theobald ................ 307/125
6,407,554 B1 * 6/2002 Godau et al. ............ 324/503

FOREIGN PATENT DOCUMENTS

| DE | G 88 01229.8 | 5/1988 | ............ H02N/6/00 |
| DE | 195 27 972.7 | 1/1997 | ............ G01M/3/18 |
| DE | 197 56 526.3 | 6/1998 | ............ H02N/6/00 |

* cited by examiner

Primary Examiner—Shawn Riley
(74) Attorney, Agent, or Firm—Karl Hormann

(57) ABSTRACT

The increasing number of mobile battery-powered small appliances with different feed voltages and connecting devices is calling for a universal and compact energy supply apparatus which provides for an uncomplicated and at the same time cost-efficient adjustability to as many small appliances as possible. To this end, the present application proposes a universal power supply unit consisting of an energy station with an integrated voltage converter in combination with various appliance-specific adapter cables with a group of electronic components. This generates an individual programming signal in the adapter cable which when coupling the adapter cable to the energy station causes a corresponding setting of the required output values. This leads to a simple matching of the unit with various small appliances and provides for a large field of applications. In particular, by feeding solar energy the power supply unit may be rendered autarchic in terms of energy.

12 Claims, 5 Drawing Sheets

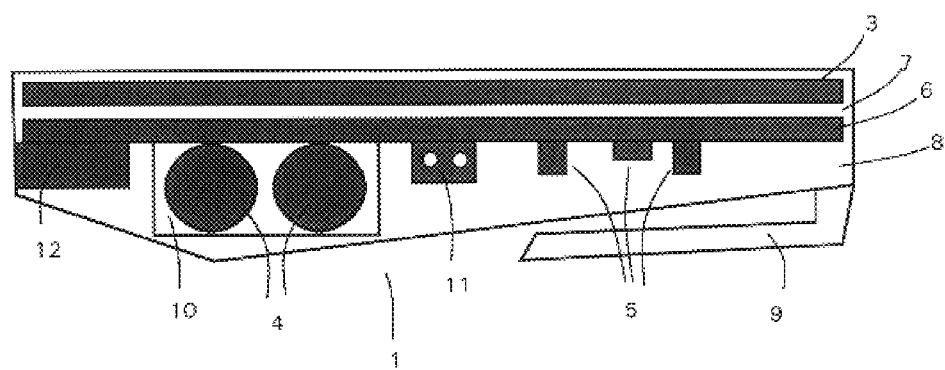
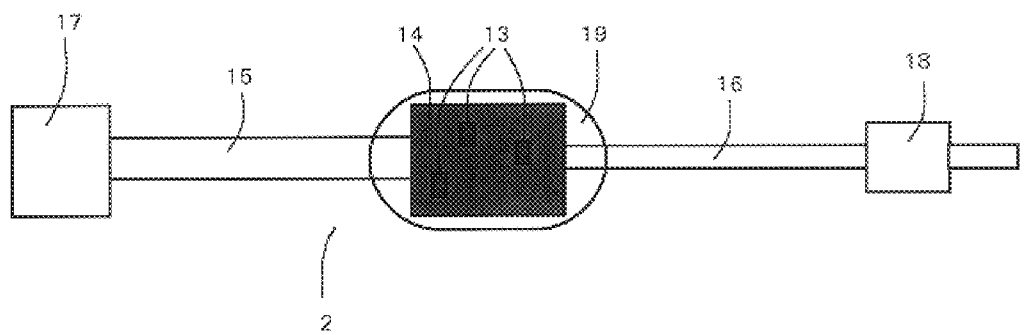
Fig. 1

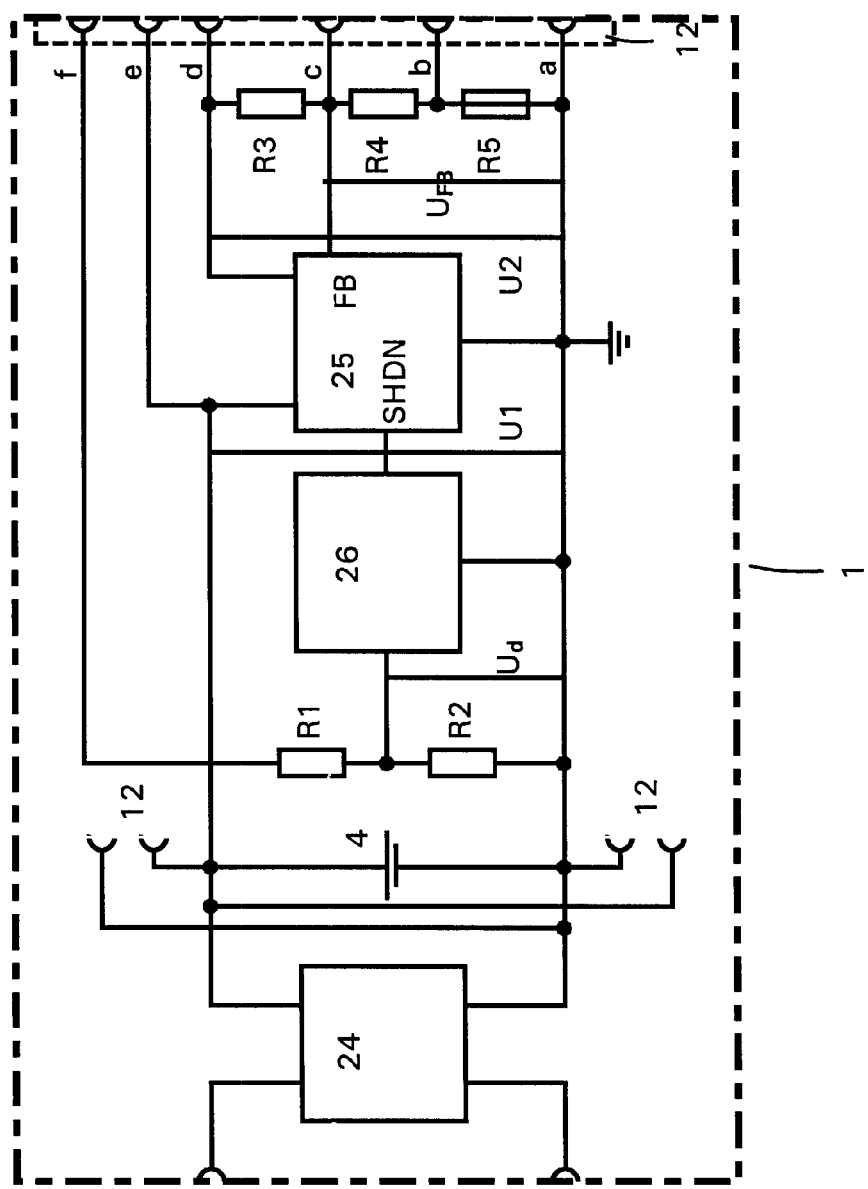

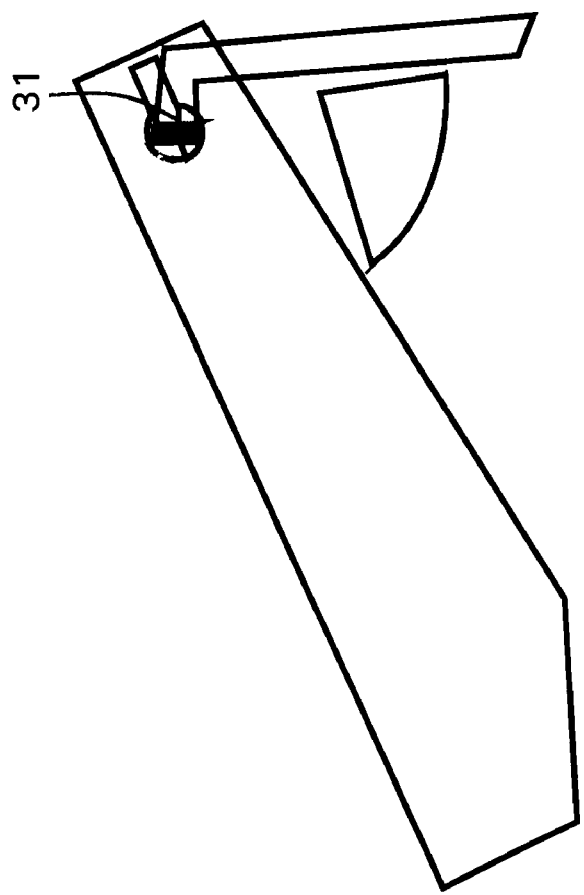
Fig. 6
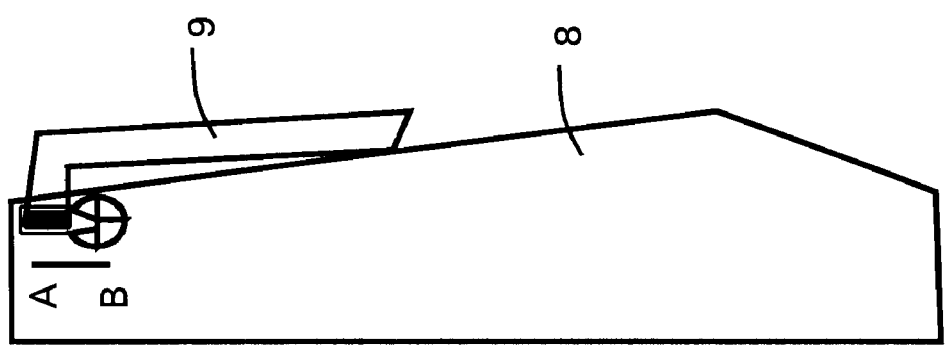

UNIVERSAL POWER SUPPLY FOR DIFFERENT SMALL ELECTRICAL DEVICES

BACKGROUND OF THE INVENTION.

1. Field of the Invention.

The present invention relates to a universal power supply unit for different small electrical appliances and consists of an energy station with an integrated voltage source and a downstream voltage converter associated with a given small appliance, for supplying an output voltage and an output current and of a standard adapter cable with an appliance-specific connector plug for transmitting the available output power to a given small appliance.

2. The Prior Art.

Compact small electrical appliances of high technical utility are being increasingly used in households, industry and while traveling. Among these, the largest segment are mobile appliances from the fields of telecommunications, data processing and audio; mobile telephones, palmtop computers or portable CD-players may be mentioned as typical examples. One characteristic of such devices is that for the sake of reduced weight and more compact dimensions they have no power packs. Instead, there usually is provided a battery receptacle for batteries which are replaceable by a user and/or a connector for supplying external power. In many cases, for instance in mobile telephones, a mains adapter is commonly furnished with the device for charging removable batteries and for simultaneously supplying power to the appliance.

Aside from the mains-powered appliances, other possibilities for energizing small appliances also exist. For instance, automotive charge cables are available for mobile telephones which in the simplest cause a drop in voltage by means of diodes and thus reduce the automobile voltage of 12 V by generating heat, to the lower charge voltage of the mobile telephone. In technically more sophisticated versions a switch transducer is provided in such a cable making the described adjustment with a high degree of efficiency. Such versions lead, however, to a significant increase in the dimensions of the cable since they require integration of a complete circuit including housing. As disclosed by German Patent specification DE 197 56 626, the NOKIA 1611 Solar or by a paper of the Fraunhofer Institut ISE at Freiburg, Germany (see 1998 Annual Report), solar current supply devices have also been proposed or realized in the field of mobile telephones.

Connector plugs containing electronic components are also know in the field of measurement technology: For instance, the Ahlborn enterprise of Holzkirchen, Germany, is marketing a sensor system called "ALMEMO" in which sensor circuits are integrated in special connector plugs, thus reducing internal interferences. In German patent application No. DE 195 27 972, a measuring resistor integrated in the end of a cable detects ruptures in water pipes. The possibility of externally controlling power supplies by removal of voltage setting or current limiting components is also known in the art.

In the mentioned supply devices the external current supply is usually designed to accommodate a certain related small appliance. This excludes the universal application of such current supply devices in connection with other small appliances provided with different connectors or requiring different feed voltages. Consequently, a large number of supply devices are used in connection with small appliances of similar power characteristics which, in principle, could be energized by a single adaptable supply apparatus.

Universal current supply devices for small appliances of different feed voltages and connectors have been known for a long time. For instance, power adapters with output voltages of from 3 to 12 V are available with a set of 4 to 6 common low power plugs and equipped with a switch for selecting the output voltage. They are suitable for operation with many audio devices as well as portable computers. Also, chargers are known in the field of solar current supplies which are provided with a plug-in cable and multiple plug adapter (see Conrad Catalog '98, e.g. "Sito Solar Charger"). They are suitable for feeding appliances of 3 V feed voltages. Other solar current supply devices are also capable of furnishing different output voltages by means of switches mounted on the supply device (see German utility model U 188 01 229 or "Sunline Solarkoffer" in Conrad Catalog, '99, page 323).

The state of the art upon which the invention is based is described in the pamphlet Solarc—innovative Solarprodukte—Variante 3: CSM9.040A02T" of the Solarc enterprise, state 09/98. It describes a universal energy station of credit card format consisting of a combination of a battery charge module and a voltage converter module. These modules are furnished for individual output voltages and connector cables which may be adapted to predetermined small appliances by the factory or by skilled users. The output voltage is set in the circuit of the energy station by a single component disposed in the negative feedback branch of a switching transducer. Upward and downward transformations of voltages are made possible with a high degree of efficiency by such switching transducers.

However, the described as well as other mentioned universal current supply devices suffer from three grave characteristics which make operating specific small appliances, such as, for instance, modern mobile telephones all but impossible for an average user. Firstly, with most small appliances their manufacturer does not reveal level and flow of the required feed voltage and of the feed current. Secondly, a user who is not technically astute cannot be expected to adjust the feed voltage and even, in some cases, the maximum current. Thirdly, the very specific connector plugs are often exclusively designed for one type of apparatus, and they are not commercially available either as accessories for universal power supply devices or individually.

OBJECT OF THE INVENTION.

The technical task of the invention, therefore, resides in providing a universal and compact energy supply unit which makes possible an uncomplicated and, at the same time, cost-efficient adaptation to many different small electrical appliances, yet allows simple utilization without adjustments such as, for instance, the selection of feed voltages. The module is also to be robust and practical. For some applications, the device is to be constituted as an autarchic energy apparatus, for instance as a solar module for energizing mobile telephones and audio devices while traveling. Such a version, in particular, requires a circuit arrangement with power losses as low as possible.

SUMMARY OF THE INVENTION.

The task is accomplished by the invention by the provision in the appliance-specific adapter cable of a group of electronic components for generating an individual programming signal which when coupling the adapter cable to an energy station is detected by a switch control unit at the voltage converter and is correspondingly converted by the voltage converter to set the required output power.

By dividing the power supply unit in accordance with the invention into a technically more elaborate energy station as the core unit and an uncomplicated peripheral part as an exchangeable component, all the requirements mentioned are attained: The application of the switching or voltage converter in the energy station results in a compact structure and to high degrees of efficiency; the design of the adapter cable with but a few structural components makes possible a low-cost adaptation to many small appliances. For the user, this entails a very simple operation. All he needs are the adapter cables fitting his small appliances. Adjustments of the energy station are completely eliminated. The output power required for a given small appliance is set automatically simply by connecting the appropriate adapter cable. Since any adjustment choices have been eliminated no mismatching can occur. The correct association of the adapter cables with the small appliances is accomplished by the appliance-specific output plug of the cables.

In order to recognize the programming signals generated by the adapter cable, the voltage converter in the energy station is provided with a detector switch control unit such as, for instance, a voltage detector. To activate the detector, it is advantageous, in accordance with one embodiment of the invention, to provide a resistor bridge in the component group of the adapter cable. This is a rugged component of small size the dimensions of which may be designed in a simple manner. This is of particular advantage if, in another embodiment, the component group is freely programmable at the energy station as to the setting of the output power. Simple access to the output power to be set is made possible in this manner, for instance by way of electronically programmable logic components. The variegation of the power supply unit in accordance with the invention may thus be improved further.

In accordance with a further embodiment of the invention, programming of physical parameters affecting the power supply may be taken into consideration, in addition to the programming of the feed voltage. In this manner, the behavior of the energy station may be influenced by the use of programmable adapter cables. A pulsating voltage may be set instead of a constant one. The available current may be limited to a maximum value. The voltage converter may be activated by insertion of the connector cable and otherwise remain in a current-saving mode. The output voltage may be varied as a function of certain physical ambient conditions such as, for instance, temperature, pressure or brightness.

In accordance with a further embodiment of the invention, the integrated voltage source of the universal power supply unit will, in the simplest case, be energized by mains power. Where it is provided with an integrated mains power device, the power supply unit may be designed as a mains plug-in device. In particular, a mains power switching component may be utilized in this connection for yielding a high degree of efficiency, low idle current and small dimensions. However, with an integrated mains power device, the energy supply station becomes relatively immovable. For that reason it is advantageous, in accordance with a further embodiment of the invention, to feed the integrated voltage source from a solar cell array. Where the power supply unit is powered by solar current as a source of direct current, it may either be coupled directly to the direct current converter operating at the optimum operating point of the solar cell array, or it may be buffered by an array of batteries charged by the solar cell array through a suitable charge control.

Occasionally it may happen that the power requirements of a consumer significantly exceed the available power, or that the charge capacity of the battery array needs to be increased. In accordance with a further embodiment of the invention, this may be accomplished by strip connectors provided on the power supply unit for parallel electrical connection of several modules. By connecting several modules by suitable cables a module field may be established the nominal power of which corresponds to the power requirement of the consumer.

If the consumer can be operated by a feed voltage corresponding to the nominal value of the voltage of the direct current source, it may be useful, for connecting an electrical consumer, to provide in the power supply unit a connector for connecting an electrical consumer. In this fashion the power losses of the direct current converter can be avoided.

In accordance with a further embodiment of the invention, a handy portable power supply unit sufficiently powerful for small electrical appliances, such as mobile telephones, portable CD-players and the like, may be fabricated by way of a solar module the basic dimensions of which substantially correspond to the size of a credit card. The solar module may have a housing provided with positioning means for aligning the solar cell array with a source of light. The housing may be structured as a hard shell case, preferably made of plastic, or as a soft housing such as a pouch. A visually appealing and, if desired, luxurious version may consist of a pouch made of soft material, preferably leather.

In accordance with a further embodiment, the positioning means may by a pin the angular disposition of which relative to the housing may be varied for attaching the module to a user's garment or for setting up the module on a sturdy surface. These means are substantially slip-proof and may include a clasp for affixing the solar module on the garment of a person. Straps and belts for attaching the solar module to an arm or torso may also be useful. Where a clasp is used, it may be structured as a pivotable element pivotable element for obliquely positioning of the solar module on a sturdy surface for a more effective alignment with impinging sun light.

In the context of the present invention the energy station may be mechanically connected or connectable with a structural unit. Such a structural unit which may, for instance, be designed for connection to the connector of the connector cable, may also contain the group of electronic components for generating the programming signal for the energy station. For instance, a solar torch or flashlight may be made by connection of an illumination accessory, or a solar ventilator device may be made by connecting a fan accessory. Moreover, the energy station may be provided with a connector for connecting to an external charger for charging a battery array. When charging the battery array, care must be taken not to overcharge it as damage or a reduced useful life of the battery array may otherwise be expected. For that reason, the electronic control circuit preferably includes a charge control unit for turning off the charge current flowing to the battery array as soon as the battery array has reached a predetermined charge condition. In a simple circuit the charge control unit registers the terminal voltage of the battery array as a measure for its charge condition and switches off the charge current when a predetermined terminal voltage has been reached during a charging operation. In principle, any kind of batteries may be used in the battery array, for example, Ni—Cd-accumulators or lithium ion batteries or rechargeable alkaline manganese cells.

DESCRIPTION OF THE SEVERAL DRAWINGS.

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 depicts a universal power supply unit in cross section with an energy station and adapter cables and a solar cell array;

FIG. 3 is a circuit diagram for the inventive power supply unit with a power mains transformer array;

FIG. 6 depicts the structural array and the operating principle of a pivotable stick pin in side elevation.

Figure 2:
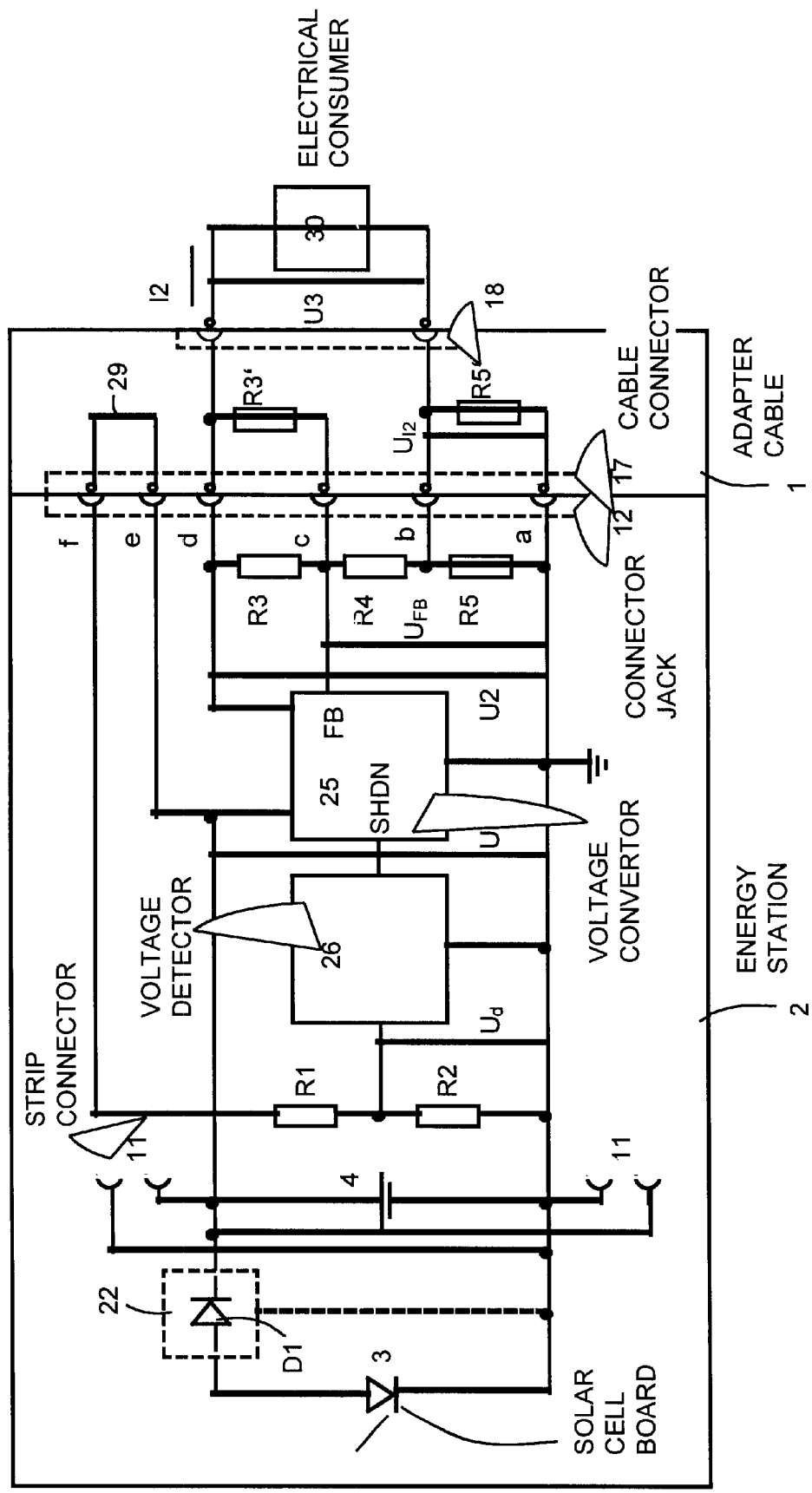
FIG. 2 depicts a circuit diagram for the inventive power supply unit of FIG. 1.

DETAILED DESCRIPTION OF THE PREFERRED EMBODIMENT.

The structural arrangement of an power supply unit is sketched out in FIG. 1. The example shown is a version in which the energy station 1 is a portable solar module with a battery array as shown by the circuit diagram of FIG. 2. The solar cell array is represented as a board 3, while the batteries 4 and the electronic components 5 are mounted on a board 6. The two boards are separated by a gap 7 for ventilation, so that when the solar cell array 3 heats up, heat transfer to the batteries 4 is as low as possible. In practice, a ventilation gap 7 of a height of 1–2 mm has been found to be useful. The boards 3, 6 and the batteries 4 are positioned in a housing 8 which is provided with a fixing pin 9 for securing the solar module on the pocket of trousers or on a belt. The housing 8 is provided with a lid, not shown in detail, for opening and closing the receptacle 10 for the batteries 4. A connector jack 12 is schematically shown at a front side of the housing 8. The strip connectors 11 may be provided in opposite side surfaces of the solar module. One of the strip connectors 11 is schematically shown in FIG. 1.

The structural arrangement of an adapter cable 2 with programming components 13 is shown in the lower portion of FIG. 1. The components 13 may, as shown, either be disposed on an electronic board 14 and preferably be mounted by SMD technology, or they may be individually soldered to the cables 15 and 16. In the arrangement shown, the cable connector 17 forms the connection to the output terminal 12 of the energy station 1, and the plug 18 forms the connection to the feed connector of the small appliance to be connected. For the relief of strain, the section of the adapter cable containing the components should be spray coated by a plastic material 19.

Figure 5:
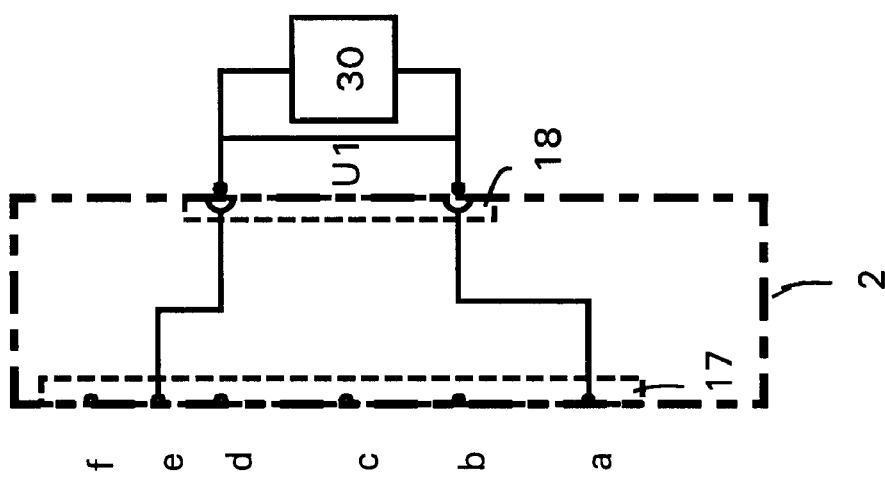
FIG. 5 is a circuit diagram for the structural component group in an apparatus-specific adapter cable for connection with a small appliance which is directly energized by a source voltage U1.

The energy station 1 shown in the circuit diagrams of FIGS. 2 and 3 contains a voltage source providing a source voltage U1 (structured either as a solar cell 3 with a battery array 5 energized by a diode D1 or by a charge control unit 22, or as a mains power transformer unit 24), as well as a voltage converter 25 including voltage detector 26. The transformed output voltage U2 is provided at the output of the voltage converter 25 which is connected to a plug-in connector d of an output jack 12. An external charging device, further solar cell arrays for increasing the solar energy output or further battery arrays for increasing capacity may, for instance, be connected to the strip connectors 11. Consumers to be directly energized by the source voltage U1 may be connected to terminal 12e, as shown in FIG. 5. Power losses induced by the voltage converter 25 may thus be avoided.

In the embodiment of FIG. 2, a battery array 4 is connected in parallel to the solar cell array 3 by way of a blocking diode D1. This embodiment is especially suitable for applications in which a constant output voltage is desired over an extended time regardless of short term fluctuations in light conditions, as, for instance, for recharging a mobile telephone with a higher current level or for use as an emergency power supply. Instead of the blocking diode D1, an electronic charge control unit 22 shown in dashed lines may be provided between the solar cell array 3 and the array of batteries 4 for blocking charge current flowing to the battery array 4 once it has attained a predetermined charge condition. The charge condition may be determined, for instance, by a charge monitor.

The battery array 4 may consist, for instance, of two series-connected battery cells (Ni—MH, Ni—CD or alkaline Mn) with a type-dependent nominal voltage of between about 1.2 and 1.6 volts each. Lithium ion batteries with a nominal voltage of 3.6 volts may also be used. In the embodiment without a battery array the switching thresholds $U_{Ein}$ and $U_{Aus}$ ($U_{Ein} > U_{Aus}$) of the voltage detector 11 are designed relative to the optimum operating point of the solar cell array 3 (maximum power point, MPP). In the embodiment including a battery array 4, they are selected such that the battery array 4 is protected from excessive discharge and is operating in as optimal a working range as possible.

The voltage detector 26 receives the voltage $U_D$ decaying at the resistor R2 and as a function of the level of voltage $U_D$, it delivers a control signal to a control input SHDN of the voltage converter 25 which transforms the source voltage U1 generated by the solar cell array 3 into an output voltage U2 determined by a voltage divider R3/(R4+R5). The output voltage U2 is derived from a fixed voltage value $U_{FB}$ which under normal operating conditions is present at the feedback input FB of the voltage converter 25. The voltage converter 25 may be, for instance, a switching regulator, a flow transformer or a switching capacitor transformer. It may raise or lower the source voltage U1, depending upon the operating voltage required by the connected consumer. The connection of the resistor R1 with the upper branch of the voltage source by way of a bridge 29 has also been shown (terminals e and f in connecting jack 12) and results in activating the voltage converter 25 by way of the voltage detector 26 when an adapter cable 2 is inserted, An electrical consumer 30 may be connected to the power supply unit by means of the output plug 18 of the adapter cable 2. The power input of the consumer depends upon the terminal voltage $U3 = U2 - U_{12}$ and upon the output current 12. By parallel connection of the resistor R3' and the voltage dividing resistor R3 (terminals c and d in the connector jack 12), the output voltage U2 will be affected by the external resistor R3' according to $U2 = U_{FB} \cdot (R3_{ges} + R4 + R5_{ges})/(R4 + R5_{ges})$ where $R3_{ges} = (R3^{-1} + R3'^{-1})^{-1}$ and $R5_{ges} = (R5^{-1} + R5'^{-1})^{-1}$.

The output current 12 is stabilized by the circuit arrangement R5 and R5'. The voltage $U_{12}$ decaying at resistor R5 in the output current circuit leads to controlled reduction of the output voltage U2 by the value $-\Delta U2 = U_{12} \cdot R3_{ges}/R4$ and thus to compensation of current changes $\Delta 12$, depending on the ratio $R3_{ges}/R4$ and $U_{12}$. The control voltage $R_{12}$ may be influenced by a resistor $R5'$ in the connection cable 2 according to $U_{12}=12\cdot(R5^{-1}+R5'^{-1})^{-1}$.

Where the power supply unit is structured as a solar module without battery unit (FIG. 2 without Pos. 2 and 4) it serves especially for the energy supply of such appliances in which short-and medium-term fluctuations in the power supply caused by fluctuations in light conditions may be tolerated. It may serve, for instance, for operating measuring devices, portable cassette-or CD-players, or mobile telephones, which are provided with an internal energy storage device and which can be charged even by low charge currents.

In the embodiment shown in FIG. 3, there is provided, instead of a solar cell array 3, a mains power transformer unit 24 providing a substantially stable voltage U1.

Figure 4:
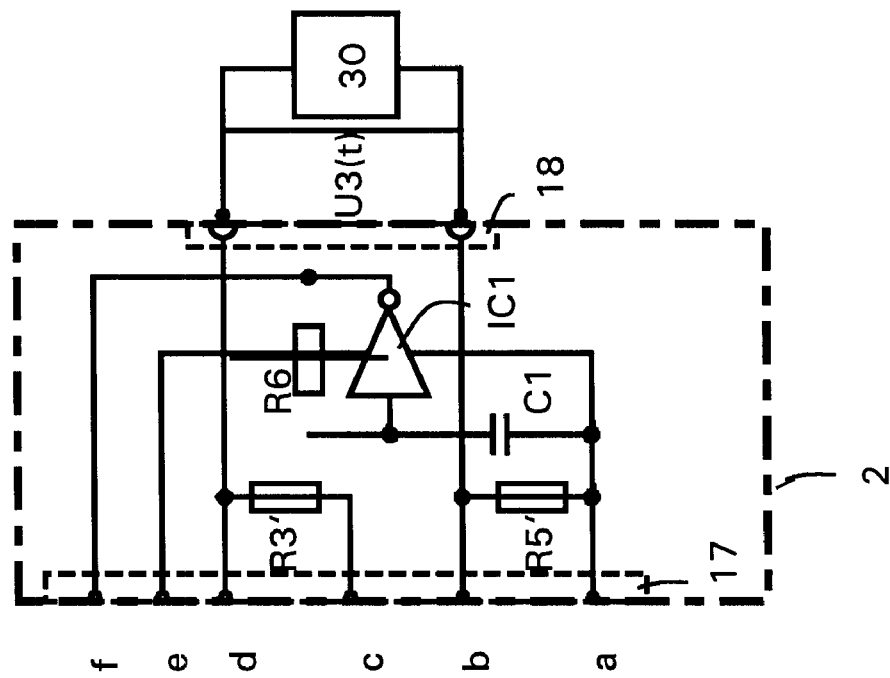
FIG. 4 is a circuit diagram of the structural component group in an apparatus-specific adapter cable for generating a pulsating output voltage.

An example of a specific circuit arrangement in the adapter cable 2 is shown in FIG. 4. It is a regenerative circuit derived from a CMOS-inverter/Schmift trigger IC1 and yields a pulsating output voltage of frequency $f(R6\cdot C1)^{-1}$. The output of IC1 controls the voltage detector 26 by way of the resistor R1 and, hence, the voltage converter 25.

FIG. 6 explains the function of the pivotable pin 9 which in an upper position A of an inverted key-hole slot is arrested for mounting and which for rearward pivoting when in the lower circular position B of the key-hole slot, is provided with a lateral pin 31. In the lower position, the pin 9 may be pivoted by about 45° to provide a support for positioning the energy station 1 obliquely.

What is claimed is:

1. A universal power supply unit for different small electrical appliances, consisting of an energy station (1) with an integrated voltage source and a downstream voltage converter (25) for making available an output voltage and an output current associated with a small appliance to be energized and at least one adapter cable (2) with an appliance-specific output plug (18) for transferring the available output values to a given small appliance, characterized by the fact that in the appliance-specific adapter cable (2) there is provided an electronic component group (13) for generating an individual programming signal which upon coupling the adapter cable (2) to the energy station (1) is detected by a switch control unit (26) at the voltage transformer (25) and is correspondingly converted by the voltage converter (25) a setting matching the output value to be made available.

2. The universal power supply unit of claim 1, characterized by the fact that the switch control unit (26) may be activated by a resistance bridge (29) in the component group (13) in the adapter cable (2).

3. The universal power supply unit of claim 1, characterized by the fact that the component group (13) is freely programmable with respect to the setting of the output power at the energy station (1).

4. The universal power supply unit of claim 3, characterized by the fact that in the programming parameters physically affecting the energy supply are taken into consideration.

5. The universal power supply unit of claim 1, characterized by the fact that the integrated voltage supply is energized by the mains supply.

6. The universal power supply unit of claim 1, characterized by the fact that the integrated voltage source is energized by way of a solar cell array (3).

7. The universal power supply unit of claim 6, characterized by the fact that energizing with solar current takes place by way of a chargeable battery array (4) as an intermediate storage unit.

8. The universal power supply unit of claim 1, characterized by the fact that strip connectors (11) are provided for an electrical parallel connection of several power supply units.

9. The universal power supply unit of claim 1, characterized by the fact that the basic dimensions of the energy station (1) approximate the size of a credit card.

10. The universal power supply unit of claim 6, characterized by the fact that for a version as a solar module there is provided a housing with positioning means for aligning the solar cell array (3) in the direction of a light source.

11. The universal power supply unit of claim 10, characterized by the fact that the positioning means comprise a stick clip (9) changeable in its angularity relative to the housing for attaching the module to the clothing of a user and for erecting the module on a rigid support.

12. The universal power supply unit of claim 1, characterized by the fact that the appliance-specific adapter cable (2) is structured as an appliance unit with additional functions.

* * * * *